Patented Nov. 7, 1950

2,529,006

UNITED STATES PATENT OFFICE 2,529,006

METHOD FOR PREPARING WOODEN BATTERY SEPARATORS

Eduard Farber and Matthew Sciascia, Washington, D. C., assignors, by mesne assignments, to Evans Products Company, Plymouth, Mich., a corporation of Delaware No Drawing. Application April 26, 1948, Serial No. 23,378

4 Claims. (Cl. 117—59)

The present invention relates to a process for preparing wooden battery separators from sliced and grooved wood.

In the prior art practice of preparing wooden battery separators, the wood separators are first treated with an aqueous solution of sodium hydroxide to remove resin and other products which would be deleterious to the lead sulfuric acid type storage battery. After alkali extraction, the battery separators are, of course, fully water-soaked and usually contain about 280 parts by weight of water to each 100 parts by weight of wood. In this condition the separators present a difficult problem in shipping because of their great bulk, the excessive freight charges due to the water content, and also because of the danger of freezing. Furthermore, when such separators are left open to the air, they dry out and warp. Forced preliminary drying of such separators is highly objectionable because of the warping encountered, and furthermore, because of the loss of permeability for the battery acid and its ions requisite to efficient performance of the battery separators in use.

Various proposals have been put forward for overcoming the difficulties incident to the preparation of wood battery separators for shipment. Some of the proposals relate to the impregnation of the separators with various salts, resins, alcohols, and alcohol derivatives. These prior art proposals usually entail a long time period of impregnation, following which the separators leave the impregnating stage with a high content of water and impregnant.

It is the purpose and object of the present invention to carry out a partial impregnation of wooden battery separators in a short period of time and under such conditions of temperature and concentration of the impregnating solution that a portion of the water in the separators is attracted and removed from the separators by the impregnating solution while partial impregnation of the separators takes place.

Through the medium of the present invention it is possible to greatly reduce the time required for partial impregnation of the wood battery separators and to eliminate the necessity of any partial drying prior to the impregnation step.

Through the employment of the present invention, the time period necessary to effect requisite impregnation and to permit substantial drying of the separators is reduced from a matter of hours down to a period of not more than a few minutes.

It has been discovered that by employing impregnating solutions containing the impregnating materials at sufficiently high concentrations, some of the water contained in the wood battery separators is attracted and removed out of the wood by the solution and the removed water is at least partially replaced by impregnating material carried in the solution.

The concentrated solution of the impregnant will, during a relatively short period of contact with the separators, attract water therefrom and leave a small amount of the impregnant in the wood. The amount of impregnant thus left in the wood has been found sufficient to protect the separators against warping during subsequent substantial partial drying. The degree of drying of the partially impregnated separators will depend on the particular requirements at the point and time of treatment. If, for instance, the separators are treated at a place remote from their point of use and the transportation costs are a significant item, the separators may be dried to a greater degree, for example, down to a final weight of around 14 grams per separator. If, however, the transportation problem is not of paramount importance and rapidity of reconstitution of the separators is a primary factor, they may be dried down to a weight of only around 16 to 18 grams per separator. As a general guide to follow in the partial drying of the separators it may be said that they should be dried sufficiently so that for each 100 parts of wood by weight there is no more than from 30 to 70 parts by weight of water in the separators. As a matter of fact, a preferred drying operation is one in which the separators are dried sufficiently so that for each 100 parts by weight of wood there is no more than from 40 to 60 parts by weight of water in the separators. The amount of impregnant carried into the wood may be regulated by appropriate selection of the time of contact of the impregnating solution with the wet separators, the temperature of the solution, and its concentration.

The impregnating solutions are preferably used at elevated temperatures not exceeding the boiling point of the solution at atmospheric pressure. Temperatures within the range of 55° C. to 90° C. have been found appropriate.

The selection of the particular impregnating material and the concentration to be employed must necessarily be such as to yield a solution having desirable physical properties. The concentration of the impregnant in the solution must be adequate to cause the solution to attract and remove water from the wet battery separators. The concentration of impregnant in the solution must not be so high as to yield a viscosity of the solution such that an objectionably large quantity of the solution is caused to adhere to the surface of the battery separator.

The separators may be subjected to the action of the impregnating solution in any suitable manner as, for example, either by dipping the separators into the solution, or by causing the solution to flow over the separators.

The impregnants employed pursuant to the present invention must be highly soluble in water, have low molecular weight, low volatility, and be non-reactive with the wood substance of the battery separators under the conditions prevailing in the process.

The following specific impregnants have been found appropriate for use in carrying out the process of the present invention. Among the suitable impregnants may be enumerated the following:

Ethylene glycol;
Monomeric sugar; and
A mixture of sodium carbonate and potassium carbonate.

When employing ethylene glycol as the impregnant, it has been found that concentrations within the limits of about 60 to 80 parts by weight of ethylene glycol in each 100 parts by weight of the aqueous solution are satisfactory.

The monomeric sugars appropriate for use as impregnants in accordance with the present invention comprise glucose, invert sugar and pentoses. When any one of these monomeric sugars is employed as the impregnant, concentration lying between about 40 parts and 60 parts by weight in each 100 parts by weight of the aqueous solution will be satisfactory. Higher concentrations yield a degree of viscosity such that too much of the solution adheres to the surface of the separator.

When employing a mixture of sodium carbonate and potassium carbonate as the impregnant, it has been found that a mixture of from 10 to 15 parts by weight of sodium carbonate with from 12 to 18 parts by weight of potassium carbonate in each 100 parts by weight of the aqueous solution is satisfactory.

Generally speaking, it has been found that a contact period for the impregnating solution with the battery separators of from 1 to 5 minutes will yield satisfactory results.

Wooden battery separators are usually about $5\frac{3}{16}$ inches by 6 inches in dimension and the wood substance in one such separator on a dry basis after extraction has a weight of about 9 grams. When such a separator has been subjected to alkali extraction followed by water washing, it contains, in addition to the wood substance, about 25 grams of water or an over-all weight of approximately 34 grams.

In accordance with the present invention, the wet battery separators are subjected to contact with the impregnating solution prior to any preliminary drying. On the average, it has been found that wet battery separators having a weight of approximately 34 grams lose about 4 grams of their water content while taking up from 1 to 4 grams of the impregnating substance from the impregnating solution.

It will be appreciated that the quantity of impregnant taken up by the wet separator is considerably below that of complete saturation. For purposes of the present invention, complete saturation of the battery separator by the impregnant is neither required nor desirable. It is desired to protect battery separators against warping on partial drying following impregnation, and this result is achieved with a very low degree of impregnation. This is a highly desirable feature of the present invention, since greater degrees of impregnation would only increase the cost without obtaining any benefit, and furthermore would yield a separator which becomes too stiff in the case of crystallization of any of the impregnant.

The following illustrative examples of the invention are given:

*Example I*

An impregnating solution containing 75 parts by weight of ethylene glycol and 25 parts by weight of water, at a temperature of 70° C., was employed. Wet battery separators having an average weight of approximately 34 grams were treated by dipping in the hot impregnating solution. When dipped to provide a time period of contact of 30 seconds, the separators were subsequently dried to an equilibrium weight of 13.7 grams with only slight warping. When the batch of separators was subjected to dipping to provide a time period of contact of 60 seconds, the separators were thereafter dried to an equilibrium weight of 16.1 grams per separator and were entirely flat. Analysis by difference in equilibrium weights gave the following approximate figures for the amounts of ethylene glycol per separator: The separators subjected to a 30 second time period of contact contained 0.7 grams of ethylene glycol, and separators subjected to a 60 second time period of contact contained 0.95 grams of ethylene glycol.

*Example II*

Wet battery separators having an average weight of 34 grams were immersed for a period of 2 minutes in a solution containing 60 parts by weight of glucose to each 100 parts of the solution at a temperature of 70° C. After this contact period with the impregnating solution, the separators had an average weight of 35 grams and were shown to have taken up by diffusion and adhesion about 5.5 grams of glucose. Another batch of separators, having an average weight of 34 grams, was immersed for 2 minutes in a solution containing 40 parts by weight of glucose to each 100 parts by weight of the solution. In this instance, the separators after immersion had an average weight of only 33 grams and were shown to contain about 3.2 grams of glucose per separator. In the latter instance, the separators had lost about 4.2 grams of water to the impregnating solution, which solution in turn had lost approximately 3.2 grams of the solute. The solution may be maintained at the requisite concentration by addition of further amounts of glucose monohydrate to restore its original concentration.

*Example III*

In this instance, the freshly extracted wet battery separators having an average weight of 34.5 grams were dipped to provide a time period of contact of 2 minutes into a solution containing 13 parts sodium carbonate and 16.5 parts potassium carbonate to each 100 parts by weight of the solution. Following the two minute contact period, the separators were found to have an average weight of 33.3 grams and to contain about 3 grams of carbonate salts calculated as water free, and it was determined that each separator had given up approximately 4 grams of water. When these separators were dried to a weight of approximately 16 grams, only very slight warping occurred with exceedingly little shrinkage. A second series of separators having an average weight of 34.5 grams were dipped in a solution of the same composition to provide a 4 minute time period of contact between the separators and the solution. In this case, it was found that 3 grams of the carbonate salts were taken up by each separator, whereas the amount of water removed was 2.5 grams per separator. On drying, the separators which had been subjected to a 4 minute time period of contact to an average weight of 16 grams remained completely flat with no substantial shrinkage.

Separators treated in accordance with the present invention and which have been dried to a weight of around 16 grams readily return to their approximate original weight when subjected to contact with water and subsequent immersion in battery acid. It has been found, upon subjection of the treated separators to contact with water at a temperature of 25° C. for 30 minutes, that the separators increase in weight from about 15 to 16 grams per separator to approximately 31 to 32.3 grams per separator, and that within two hours after immersion in battery acid the separators further increase in weight to approximately 34.8 grams per separator.

Having thus described our invention, what we claim is:

1. A method for treating wooden battery separators comprising initially extracting the separators with an alkali, water washing the extracted separators to saturation, subjecting the water-washed saturated separators to a partial impregnation by contacting the separators for a time period of from 1 to 5 minutes with an aqueous impregnating solution maintained at a temperature within the range of about 55° C. to about 90° C., said solution consisting of water and an impregnating material selected from the group consisting of ethylene glycol and monomeric sugar, to remove a portion of the water in the separators and effect at least partial replacement of the removed water with said impregnating material, and thereafter drying the so impregnated separators, said impregnating solution containing from about 60 to about 80 percent by weight of said material when ethylene glycol is employed, and from about 40 to about 60 percent by weight of said material when monomeric sugar is employed.

2. The method of claim 1 in which the battery separators take up from the impregnating solution from 1 to 4 grams of impregnating material for each 9 grams of wood on a dry basis in the separators.

3. The method of claim 1 wherein the drying of the partially impregnated separators is continued until there is from 30 to 70 parts of water for each 100 parts of wood in the separators.

4. A method for treating wooden battery separators comprising initially extracting the separators with an alkali, water washing the extracted separators to saturation, subjecting the water-washed saturated separators to a partial impregnation by contacting the separators for a time period of from 1 to 5 minutes with an aqueous impregnating solution maintained at a temperature within the range of about 55° C. to about 90° C., and consisting of from about 40 to about 60 percent by weight of glucose, to remove a portion of the water in the separators and effect at least partial replacement of the removed water with the glucose, and thereafter drying the so impregnated separators.

EDUARD FARBER.
MATTHEW SCIASCIA.

REFERENCES CITED

The following references are of record in the file of this patent:

UNITED STATES PATENTS

| Number | Name | Date |
|---|---|---|
| 1,507,076 | Luhrman | Sept. 2, 1924 |
| 2,030,819 | Herzog et al. | Feb. 11, 1936 |
| 2,045,350 | Griffin et al. | June 23, 1936 |

OTHER REFERENCES

"Chemical Seasoning" progress report No. 1, West Coast Lumber Assn., Seattle, Washington, 1943, pages 14 and 18.